United States Patent
Amarilio et al.

(10) Patent No.: US 9,336,311 B1
(45) Date of Patent: May 10, 2016

(54) DETERMINING THE RELEVANCY OF ENTITIES

(71) Applicant: Google Inc., Mountain View, CA (US)

(72) Inventors: Tomer Amarilio, Kiriat Ata (IL); Itay Maman, Haifa (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/652,017

(22) Filed: Oct. 15, 2012

(51) Int. Cl.
*G06F 17/30* (2006.01)

(52) U.S. Cl.
CPC .... *G06F 17/30864* (2013.01); *G06F 17/30867* (2013.01)

(58) Field of Classification Search
CPC ............... G06F 17/30979; G06F 17/30864; G06F 17/3053; G06F 17/30867; G06F 17/30539; G06F 17/30011; G06F 17/3089; G06F 17/3087; G06F 17/30424; G06F 17/30657; G06F 17/30663; G06F 17/30873
USPC .................................................. 707/728, 749
See application file for complete search history.

(56) References Cited

U.S. PATENT DOCUMENTS

| | | | |
|---|---|---|---|
| 7,571,177 B2 | 8/2009 | Damle | |
| 7,716,217 B2 * | 5/2010 | Marston et al. | 707/728 |
| 8,380,721 B2 | 2/2013 | Attaran | |
| 8,407,253 B2 | 3/2013 | Ryu | |
| 8,510,321 B2 | 8/2013 | Ranganathan | |
| 2010/0179874 A1 * | 7/2010 | Higgins et al. | 705/14.53 |
| 2010/0306249 A1 * | 12/2010 | Hill et al. | 707/769 |
| 2010/0318537 A1 | 12/2010 | Surendran | |
| 2011/0047167 A1 * | 2/2011 | Caceres | 707/749 |
| 2011/0078205 A1 | 3/2011 | Salkeld | |
| 2012/0158527 A1 * | 6/2012 | Cannelongo et al. | 705/14.73 |
| 2012/0158633 A1 | 6/2012 | Eder | |
| 2013/0024479 A1 * | 1/2013 | Gong et al. | 707/798 |
| 2013/0144899 A1 * | 6/2013 | Lee et al. | 707/759 |
| 2014/0015837 A1 * | 1/2014 | Soshin | 345/440 |

FOREIGN PATENT DOCUMENTS

WO    WO2008134588 A1    11/2008

OTHER PUBLICATIONS

Chon et al., "Range and kNN Query Processing for Moving Objects in Grid Model," Mobile Networks and Applications, 8(4):401-412, Aug. 2003.

(Continued)

*Primary Examiner* — Shahid Alam
*Assistant Examiner* — Andalib Lodhi
(74) *Attorney, Agent, or Firm* — Fish & Richardson P.C.

(57) ABSTRACT

Methods, systems, and apparatus, including computer programs encoded on computer storage media, for determining the relevancy of entities. One of the methods includes obtaining a first entity identifier, wherein the first entity identifier identifies a first entity associated with a query; identifying one or more second entities associated with the first entity; and for each of the one or more second entities, determining a relevancy score for the second entity from a measure of the popularity of the second entity and a measure of the freshness of the second entity, wherein the relevancy score represents a relevance of the second entity to the query; determining that the relevancy score satisfies a threshold; and providing the second entity in response to the query.

16 Claims, 9 Drawing Sheets

(56) References Cited

OTHER PUBLICATIONS

Jang and Lee, "Hierarchical filtering method for content-based music retrieval via acoustic input," In Proceedings of the ninth ACM international conference on Multimedia, Oct. 2001, pp. 401-410.
Kolahdouzan and Shahabi, "Alternative Solutions for Continuous K Nearest Neighbor Queries in Spatial Network Databases," GeoInformatica, 9(4):321-341, Dec. 2005.
Motro, "VAGUE: A User Interface to Relational Databases that Permits Vague Queries," ACM Transactions on Information Systems (TOIS), 6(3):187-214, Jul. 1988.
Papadias et al., "Aggregate Nearest Neighbor Queries in Spatial Databases," ACM Transactions on Database Systems (TODS), 30(2):529-576, Jun. 2005.
Singh et al., "High Dimensional Reverse Nearest Neighbor Queries," CIKM'03 Proceedings of the twelfth international conference on Information and knowledge management, Nov. 3-8, 2003, pp. 91-98.

* cited by examiner

DETERMINING THE RELEVANCY OF ENTITIES

BACKGROUND

This specification relates generally to providing information in response to a query.

A search engine receives queries, for example, from one or more users and returns query results responsive to the queries. For example, the search engine can identify resources responsive to a query, generate query results with information about the resources, and cause presentation of the query results corresponding to the resources in response to the query. Each search result can include, for example, a title of the resource, an address, e.g., URL, of the resource, and a snippet of content from the resource. Some queries can be better satisfied by directly providing information that is relevant to the user's query. The usefulness of a search engine can depend on its ability to provide relevant information in response to such queries.

SUMMARY

This specification describes technology relating to determining the relevancy of entities.

In general, one innovative aspect of the subject matter described in this specification can be embodied in methods that include the actions of obtaining a first entity identifier, wherein the first entity identifier identifies a first entity associated with a query; identifying one or more second entities associated with the first entity; and for each of the one or more second entities, determining a relevancy score for the second entity from a measure of the popularity of the second entity and a measure of the freshness of the second entity, wherein the relevancy score represents a relevance of the second entity to the query; determining that the relevancy score satisfies a threshold; and providing the second entity in response to the query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

Identifying one or more second entities associated with the first entity can include identifying from a data source the one or more second entities that are associated with the first entity in the data source. The data source can be one or more knowledge graphs or one or more publicly available databases.

Determining the relevancy score for the second entity can include calculating a popularity score for the second entity; calculating a freshness score for second entity; and determining the relevancy score for the second entity from the popularity score and the freshness score. Calculating the popularity score for the second entity can include obtaining one or more signals that indicate the measure of the popularity of the second entity, wherein the one or more signals describe at least one of a number of queries for the second entity; a number of interactions with the second entity in one or more social networks; and a number of documents that reference the second entity; and calculating the popularity score based on the one or more signals. The number of queries and the number of interactions can be within a time period. Calculating the freshness score for the second entity can include obtaining one or more signals that indicate the measure of the freshness of the second entity, wherein the one or more signals describe one or more dates associated with the second entity; and calculating the freshness score based on the one or more signals.

Providing the second entity can include presenting the second entity and information associated with the second entity in an answer box, wherein the answer box includes text describing the second entity and information. The answer box can include a plurality of the one or more second entities, wherein each of the plurality of second entities has a relevancy score that satisfies the threshold. Providing the second entity further can include presenting the answer box with query results that are responsive to the query.

The subject matter described in this specification can be implemented in particular embodiments so as to realize one or more of the following advantages. The relevance of entities to search queries can be determined. Information about entities that are relevant to search queries can be provided.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

Figure 1:
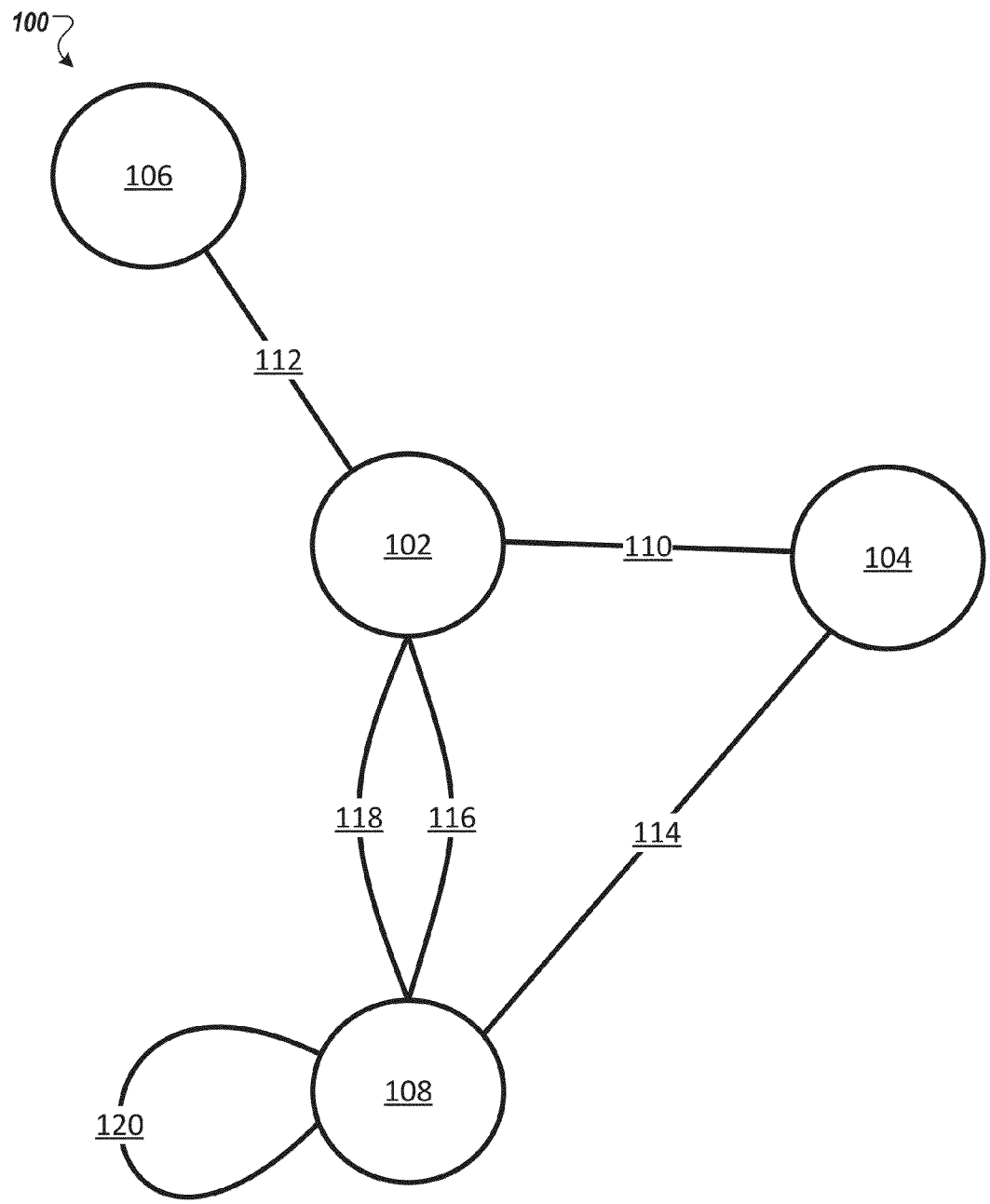
FIG. 1 illustrates an example knowledge graph containing nodes and edges.

FIG. 1 illustrates an example knowledge graph 100 containing nodes and edges. Illustrative knowledge graph 100 includes nodes 102, 104, 106, and 108. Knowledge graph 100 includes edge 110 connecting node 102 and node 104. Knowledge graph 100 includes edge 112 connecting node 102 and node 106. Knowledge graph 100 includes edge 114 connecting node 104 and node 108. Knowledge graph 100 includes edge 116 and edge 118 connecting node 102 and node 108. Knowledge graph 100 includes edge 120 connecting node 108 to itself. Each aforementioned group of an edge and one or two distinct nodes may be referred to as a triple or 3-tuple. As illustrated, node 102 is directly connected by edges to three other nodes, while nodes 104 and 108 are directly connected by edges to two other nodes. Node 106 is connected by an edge to only one other node, and in some implementations, node 106 is referred to as a terminal node. As illustrated, nodes 102 and 108 are connected by two edges, indicating that the relationship between the nodes is defined by more than one property. As illustrated, node 108 is connected by edge 120 to itself, indicating that a node may relate to itself. While illustrative knowledge graph 100 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

A node of a knowledge graph may represent an entity. An entity is a thing or concept that is singular, unique, well-defined and distinguishable. For example, an entity may be a person, place, item, idea, abstract concept, concrete element, other suitable thing, or any combination thereof. Nodes are unique, in that no two nodes refer to the same thing or concept. Generally, entities include things or concepts represented linguistically by nouns. For example, the color "Blue," the city "San Francisco," and the imaginary animal "Unicorn" may each be entities. An entity generally refers to the concept of the entity. For example, the entity "New York City" refers to the physical city, and the knowledge graph uses a concept of the physical city as represented by, for example, an element in a data structure, the name of the entity, any other suitable element, or any combination thereof.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an "Is A" edge or link, discussed further below, such that the graph represents the information "The Entity X Is Type Y." For example, the entity node "George Washington" may be connected to the entity type node "President." An entity node may be connected to multiple entity type nodes, for example, "George Washington" may also be connected to entity type node "Person" and to entity type node "Military Commander." In another example, the entity type node "City" may be connected to entity nodes "New York City" and "San Francisco." In another example, the concept "Tall People," although incompletely defined, i.e., it does not necessarily include a definition of "tall", may exist as an entity type node. In some implementations, the presence of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entities are associated with types in more than one domain. For example, the entity node "Benjamin Franklin" may be connected with the entity type node "Politician" in the domain "Government" as well as the entity type node "Inventor" in the domain "Business".

In some implementations, properties associated with entity nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity node "Knowledge Graph" that is connected to property nodes that describe a knowledge graph's properties such as "Has Nodes" and "Has Edges."

Specific values, in some implementations referred to as literals, may be associated with a particular entity in a terminal node by an edge defining the relationship. Literals may refer to values and/or strings of information. For example, literals may include dates, names, and/or numbers. In an example, the entity node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington, "President Washington," and "President George Washington" may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city "Philadelphia," an entity node related to the movie "Philadelphia," and an entity node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated types, by other entities connected to it by particular properties, by its name, by any other suitable information, or any combination thereof. These connections may be useful in disambiguating, for example, the node "Georgia" that is connected to the node "United States" may be understood represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type," "Has Property," "Has Value," any other suitable statement, or any combination thereof. For example, the entity node of a particular person may be connected by a "Date Of Birth" edge to a terminal node containing a literal of his or her specific date of birth. In some implementations, the properties defined by edge connections of an entity may relate to nodes connected to the type of that entity. For example, the entity type node "Movie" may be connected to entity nodes "Actor" and "Director," and a particular movie may be connected by an edge property "Has Actor" to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity node "George Washington," which is connected to entity type node "Person" by an "Is A" edge, may also be connected to a literal "Feb. 22, 1732" by the edge "Has Date Of Birth." In some implementations, the entity node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node "George Washington" may be connected by an "Is A" edge to the entity type node representing "Person," thus indicating an entity type of the entity, and may also be connected to a literal "Feb. 22, 1732" by the edge "Has Date Of Birth," thus defining a property of the entity. In this way, the knowledge graph defines both entity types and properties associated with a particular entity by connecting to other nodes. In some implementations, "Feb. 22, 1732" may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

Figure 2:
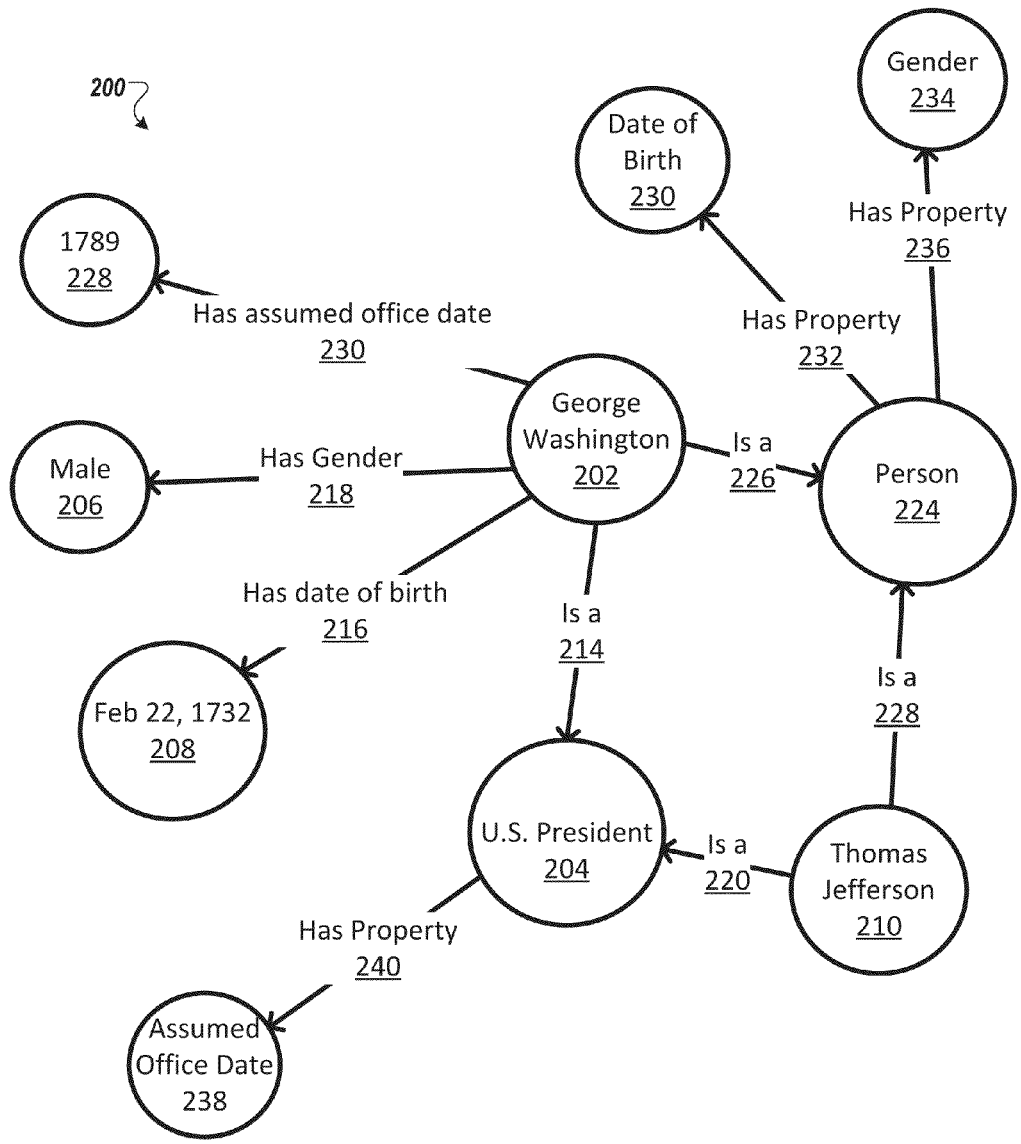
FIG. 2 illustrates an example knowledge graph portion.

FIG. 2 illustrates an example knowledge graph portion 200. Knowledge graph portion 200 includes information related to the entity "George Washington," represented by "George Washington" node 202. "George Washington" node 202 is connected to "U.S. President" entity type node 204 by "Is A" edge 214 with the semantic content "Is A," such that the 3-tuple defined by nodes 202 and 204 and the edge 214 contains the information "George Washington is a U.S. President." Similarly, the information "Thomas Jefferson Is A U.S. President" is represented by the tuple of "Thomas Jefferson" node 210, "Is A" edge 220, and "U.S. President" node 204. Knowledge graph portion 200 includes entity type nodes "Person" 224, and "U.S. President" node 204. The person type is defined in part by the connections from "Person" node 224. For example, the type "Person" is defined as having the property "Date Of Birth" by node 230 and edge 232, and is defined as having the property "Gender" by node 234 and edge 236. These relationships define in part a schema associated with the entity type "Person."

"George Washington" node 202 is shown in knowledge graph portion 200 to be of the entity types "Person" and "U.S. President," and thus is connected to nodes containing values associated with those types. For example, "George Washington" node 202 is connected by "Has Gender" edge 218 to "Male" node 206, thus indicating that "George Washington has gender "Male." Further, "Male" node 206 may be connected to the "Gender" node 234 indicating that "Male Is A Type Of Gender." Similarly, "George Washington" node 202 is be connected by "Has Date of Birth" edge 216 to "Feb. 22, 1732" node 208, thus indicating that "George Washington Has Date Of Birth Feb. 22, 1732." "George Washington" node 202 may also be connected to "1789" node 228 by "Has Assumed Office Date" edge 230.

Knowledge graph portion 200 also includes "Thomas Jefferson" node 210, connected by "Is A" edge 220 to entity type "U.S. President" node 204 and by "Is A" edge 228 to "Person" entity type node 224. Thus, knowledge graph portion 200 indicates that "Thomas Jefferson" has the entity types "U.S. President" and "Person." In some implementations, "Thomas Jefferson" node 210 is connected to nodes not shown in FIG. 2 referencing his date of birth, gender, and assumed office date.

It will be understood that knowledge graph portion 200 is merely an example and that it may include nodes and edges not shown. For example, "U.S. President" node 204 may be connected to all of the U.S. Presidents. "U.S. President" node 204 may also be connected to properties related to the entity type such as a duration of term, for example "4 Years," a term limit, for example "2 Terms," a location of office, for example "Washington D.C.," any other suitable data, or any combination thereof. For example, "U.S. President" node 204 is connected to "Assumed Office Date" node 238 by "Has Property" edge 240, defining in part a schema for the type "U.S. President." Similarly, "Thomas Jefferson" node 210 may be connected to any suitable number of nodes containing further information related to his illustrated entity type nodes "U.S. President," and "Person," and to other entity type nodes not shown such as "Inventor," "Vice President," and "Author." In a further example, "Person" node 224 may be connected to all entities in the knowledge graph with the type "Person." In a further example, "1789" node 228 may be connected to all events in the knowledge graph with the property of year "1789." "1789" node 228 is unique to the year 1789, and disambiguated from, for example, a book entitled "1789," not shown in FIG. 2, by its unique identification reference. In some implementations, "1789" node 228 is connected to the entity type node "Year."

Figure 3:
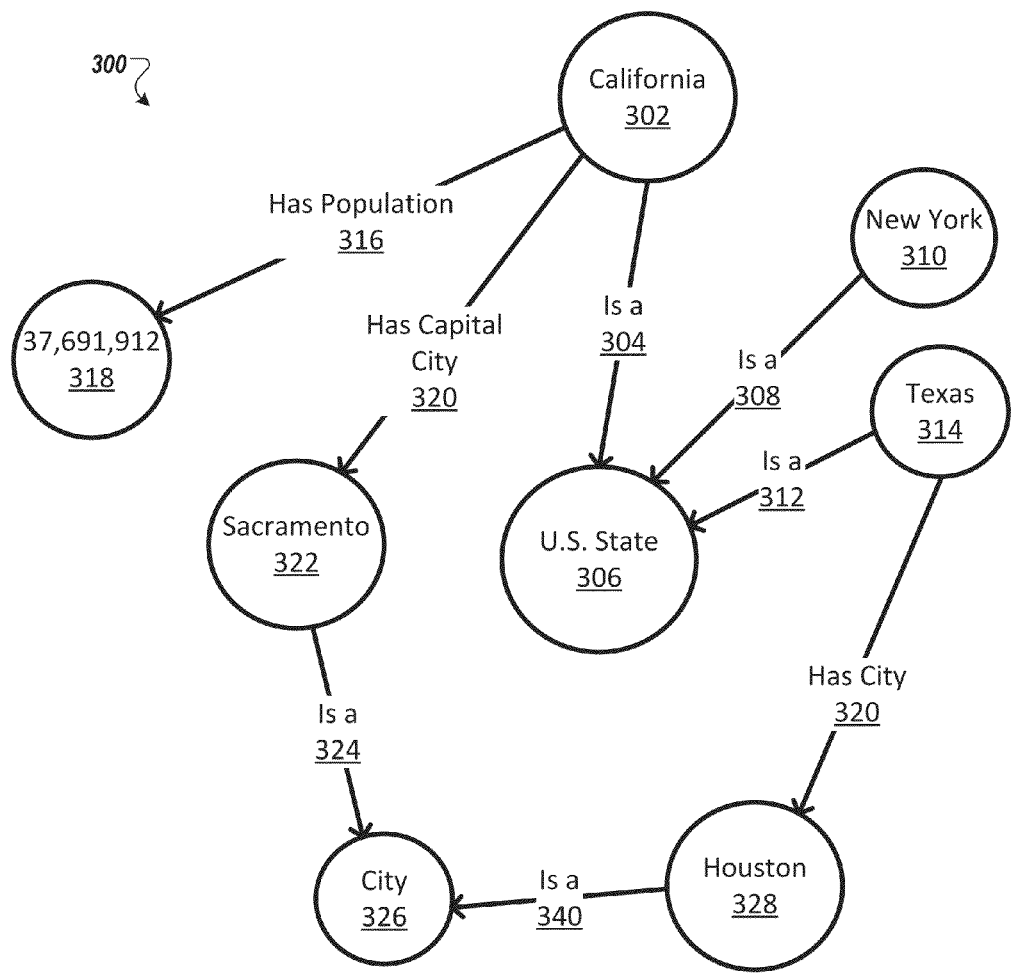
FIG. 3 illustrates another example knowledge graph portion.

FIG. 3 illustrates another example knowledge graph portion 300. Knowledge graph portion 300 includes "California" node 302, which may also be associated with differentiation aliases such as, for example, "CA," "Calif," "Golden State," any other suitable differentiation aliases, or any combination thereof. In some implementations, these differentiations are stored in "California" node 302. California is connected by "Is A" edge 304 to the "U.S. State" entity type node 306. "New York" node 310 and "Texas" node 314 are also connected to "U.S. State" node 306 by "Is A" edges 308 and 312, respectively. "California" node 302 is connected by "Has Capital City" edge 320 to "Sacramento" node 322, indicating the information that "California Has Capital City Sacramento." Sacramento node 322 is further connected by "Is A" edge 324 to the "City" entity type node 326. Similarly, "Texas" node 314 is connected by "Has City" edge 320 to "Houston" node 328, which is further connected to the "City" entity type node 326 by "Is A" edge 340. "California" node 302 is connected by "Has Population" edge 316 to node 318 containing the literal value "37,691,912." In an example, the particular value "37,691,912" may be periodically automatically updated by the knowledge graph based on an external website or other source of data. Knowledge graph portion 300 may include other nodes not shown. For example, "U.S. State" entity type node 306 may be connected to nodes defining properties of that type such as "Population" and "Capital City." These type-property relationships may be used to define other relationships in knowledge graph portion 300 such as "Has Copulation" edge 316 connecting entity node "California" 316 with terminal node 318 containing the literal defining the population of California.

Figure 4:
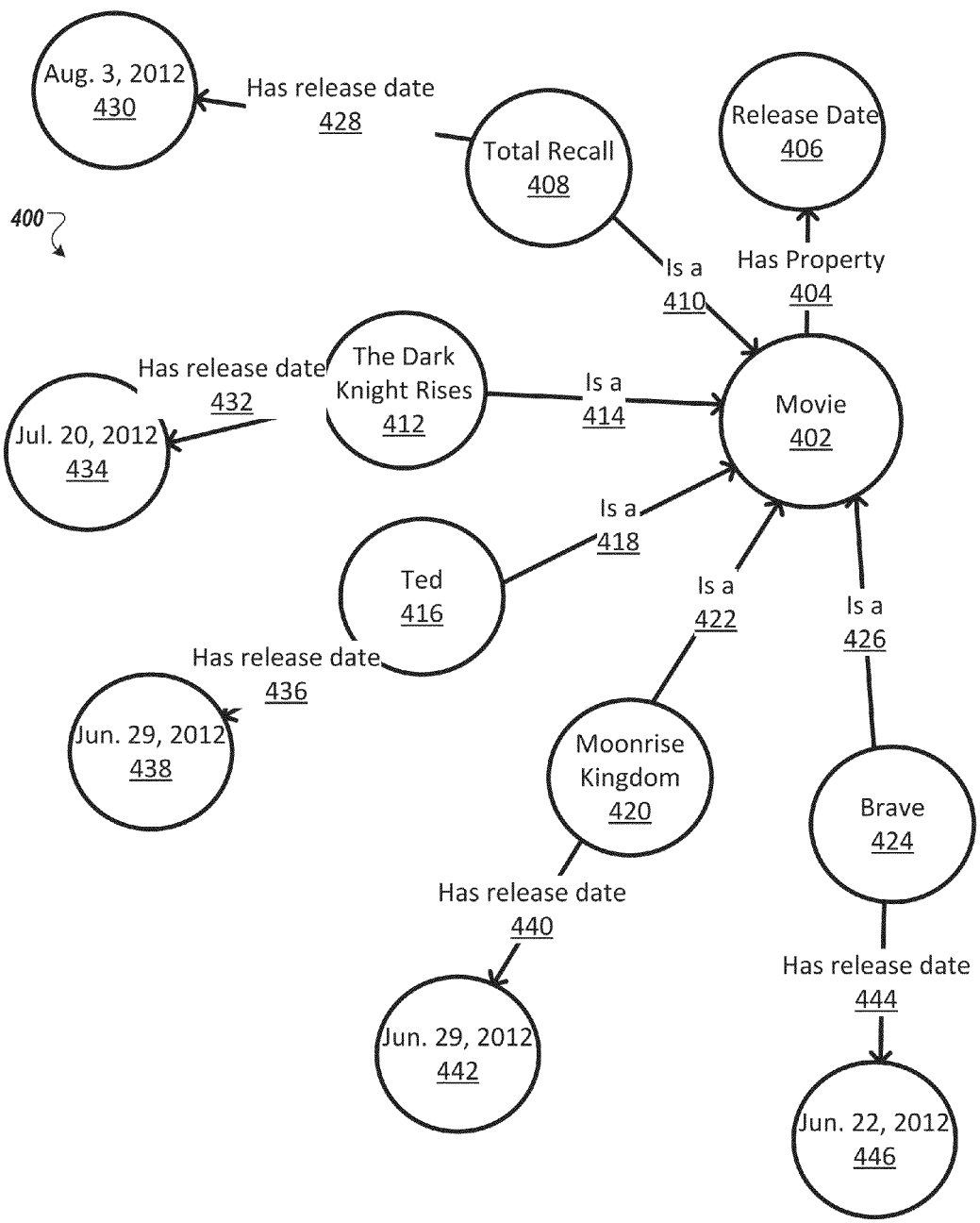
FIG. 4 illustrates another example knowledge graph portion.

FIG. 4 illustrates another example knowledge graph portion 400. Knowledge graph portion 400 includes information related to movie entities "Total Recall," The Dark Knight Rises," "Ted," "Moonrise Kingdom," and "Brave," as represented by the "Total Recall" node 408, the "The Dark Knight Rises" node 412, the "Ted" node 416, the "Moonrise Kingdom" node 420, and the "Brave" node 424, respectively. Each of the movie entity nodes is connected by "Is a" edge to the movie entity type node 402.

The entity type "Movie" is defined in part by the connections from "Movie" node 402. For example, the entity type "Movie" is defined as having the property "Release Date" by node 406 and edge 404. Additional connections to other properties can exist for the entity type "Movie" that are not depicted in FIG. 4, such as movie ticket sale date or last date in theaters. These relationships define in part a schema associated with the entity type "Movie."

Each of the entity nodes is shown in knowledge graph portion 400 to be of the entity type "Movie," and thus is connected to nodes containing values associated with the movie entity type. For example, "Total Recall" node 408 is connected by "Has release date" edge 428 to "Aug. 3, 2012" node 430. This indicates, "Total Recall has release date of Aug. 3, 2012." "The Dark Knight Rises" node 412 is connected by "Has release date" edge 432 to "Jul. 20, 2012" node 434. This indicates, "The Dark Knight Rises has release date of Jul. 20, 2012." "Ted" node 416 is connected by "Has release date" edge 436 to "Jun. 29, 2012" node 430. This indicates, "Ted has release date of Jun. 29, 2012." "Moonrise Kingdom" node 420 is connected by "Has release date" edge 440 to "Jun. 29, 2012" node 430. This indicates, "Moonrise Kingdom has release date of Jun. 29, 2012." "Brave" node 424 is connected by "Has release date" edge 444 to "Jun. 22, 2012" node 430. This indicates, "Brave has release date of Jun. 22, 2012."

It will be understood that knowledge graph portion 400 is merely an example and that it may include nodes and edges not shown. For example, "Movie" node 402 may also be connected to other properties related to the entity type such as cast members, producers, directors, filming locations, news items related to the movie, e.g., awards or box office performance, and any other suitable data, or any combination thereof. Similarly, the movie entity nodes may be connected to any suitable number of nodes containing further information related to its illustrated entity type node "Movie."

Figure 5:
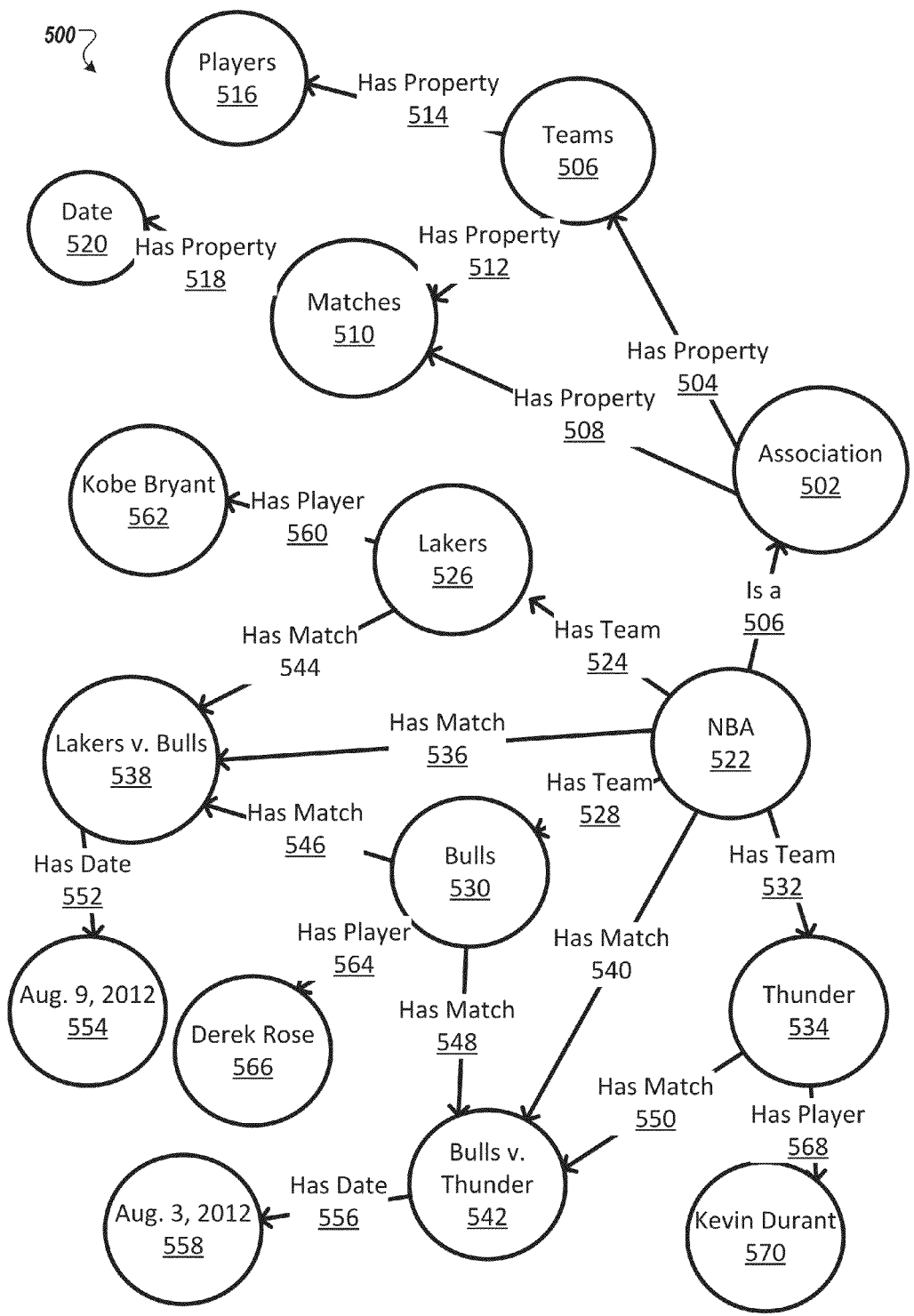
FIG. 5 illustrates another example knowledge graph portion.

FIG. 5 illustrates another example knowledge graph portion 500. Knowledge graph portion 500 includes information related to the association entity "NBA," i.e., the National Basketball Association, represented by the "NBA" node 522. "NBA" is connected by "Is a" edge 506 to the "Association" entity type node 502.

The entity type "Associations" is defined in part by the connections from "Association" node 502. For example, the entity type "Association" is defined as having the properties "Teams" by node 506 and edge 504 and "Matches" by node 510 and edge 508. Each property can be defined in part by the connections from the respective property node. For example, the property "Teams" is defined as having the properties "Players" by node 516 and edge 514 and "Matches by node 510 and edge 512. Additionally, the property "Matches" is defined as having the property "Date" by node 520 and edge 518.

The "NBA" node 522 is shown in knowledge graph portion 500 to be of the entity type "Association," and thus is connected to nodes containing values associated with the entity type. "NBA" node 522 is connected to nodes that represent teams, which is a property of association entities. For example, "NBA" node 522 is connected by "Has Team" edge 524 to "Lakers" node 526. This indicates, "NBA has Lakers team." "NBA" node 522 is also connected by "Has Team" edge 528 to "Bulls" node 530. This indicates, "NBA has Bulls team." "NBA" node 522 is further connected by "Has Team" edge 532 to "Thunder" node 534. This indicates, "NBA has Thunders team." Furthermore, "NBA" node 522 is connected to nodes that represent matches, which is a property of association entities. For example, "NBA" node 522 is connected by "Has Match" edge 536 to "Lakers v. Bulls" node 538. This indicates, "NBA has Lakers v. Bulls match." "NBA" node 522 is also connected by "Has Match" edge 540 to "Bulls v. Thunder" node 542. This indicates, "NBA has Bulls v. Thunder match."

The nodes that represent teams are connected to nodes that represent players, which is a property of team entities. For example, "Lakers" node 526 is connected by "Has Player" edge 560 to "Kobe Bryant" node 562. This indicates, "Lakers have player Kobe Bryant." "Bulls" node 530 is connected by "Has Player" edge 564 to "Derek Rose" node 566. This indicates, "Bulls have player Derek Rose." "Thunder" node 534 is connected by "Has Player" edge 568 to "Kevin Durant" node 570. This indicates, "Thunder have player Kevin Durant." The nodes that represent teams are further connected to nodes that represent matches, which is a property of team entities. For example, "Lakers" node 526 is connected by "Has Match" edge 544 to "Lakers v. Bulls" node 538. This indicates, "Lakers have match versus Bulls." "Bulls" node 530 is connected by "Has Match" edge 546 to "Lakers v. Bulls" node 538. This indicates, "Bulls have match versus Lakers." "Bulls" node 530 is further connected by "Has Match" edge 548 to "Bulls v. Thunder" node 542. This indicates, "Bulls have match versus Thunder." "Thunder" node 534 is connected by "Has Match" edge 550 to "Bulls v. Thunder" node 542. This indicates, "Thunder have match versus Bulls."

The nodes that represent matches are connected to nodes that represent dates, which is a property of match entities. For example, "Lakers v. Bulls" node 538 is connected by "Has Date" edge 552 to "Aug. 9, 2012." This indicates, "Lakers v. Bulls match has date of Aug. 9, 2012." "Bulls v. Thunder" node 542 is connected by "Has Date" edge 556 to "Aug. 3, 2012." This indicates, "Bulls v. Thunder match has date of Aug. 2, 2012."

It will be understood that knowledge graph portion 500 is merely an example and that it may include nodes and edges not shown. For example, "Association" node 502 may also be connected to other properties related to the entity type such as president, divisions, coaches, countries, and any other suitable data, or any combination thereof. Similarly, the different property nodes may also be connected to other properties not shown. For example, "Teams" node 506 may also be connected to other properties related to the entity such as coach, location, supporters, e.g., fans, and any other suitable data, or any combination thereof. The nodes may be connected to any suitable number of nodes containing further information related to it.

Figure 6:
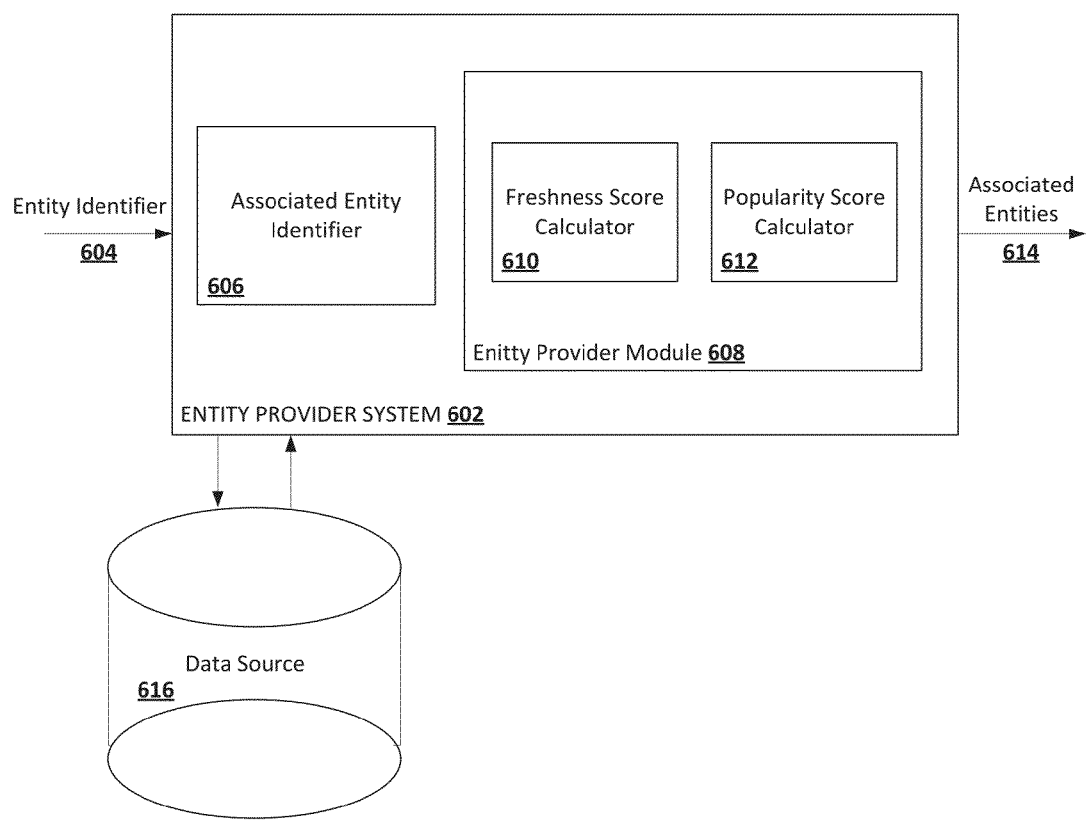
FIG. 6 illustrates an example entity provider system.

FIG. 6 illustrates an example entity provider system 602 as can be implemented for use in an Internet, an intranet, or another client and server environment. The entity provider system 602 can be implemented as, for example, computer programs running on one or more computers in one or more locations that are coupled to each other through a network. The systems, components, and techniques described below can be implemented in the example information provider system.

The entity provider system 602 includes an associated entity identifier 606 and an entity provider module 608. The entity provider system 602 can communicate with data source 616 through one or more wired or wireless networks, e.g., mobile phone networks, local area networks (LANs) or wide area networks (WANs), e.g., the Internet. In some implementations, data source 616 can be one or more data sources. For example, the entity provider system 602 can communicate with one or more databases that contain data organized in the form of a knowledge graph, as described above. Alternatively, the entity provider system 602 can communicate with one or more data sources, including publicly available sources, e.g., the Internet Move Database (IMDB), Wikipedia, Ticketmaster, Freebase, and/or a news source.

The entity provider system 602 obtains an entity identifier 604, as described in more detail below with reference to FIG. 7. An entity identifier identifies an entity that is associated with a search query submitted by a user. Entity identifiers can be text that describes the entities associated with search queries. For example, the text "Kobe Bryant" can be an entity identifier for the person entity, Kobe Bryant. As a further example, the text "The Dark Knight Rises" can be an entity identifier for the movie entity, The Dark Knight Rises. The entity identifiers can identify entities of any entity type. Example entity types include movies, actors, music artists, concerts, authors, TV shows, etc. In some implementations, the obtained entity identifier can identify a specific entity type. For example, the obtained entity identifier can be "movies," "actors," "music artists," etc.

The associated entity identifier 606 identifies entities that are associated with the entity identified by the entity identifier 604, as described in more detail below with reference to FIG. 7. The entities can be identified from the one or more data sources 616, as described above. For example, book entities can be identified as associated with author entities, movie and T.V. show entities can be identified as associated with actor entities, and concert entities can be identified as associated with music artist entities. As further examples, release date entities can be identified as associated with movie entities, team and match entities can be identified as associated with association entities, e.g., the NBA, player entities can be identified as associated with team entities, and date entities can be identified as associated with match entities.

The entity provider module 608 determines a relevancy score for each of the entities identified by associated entity identifier 606. The relevancy score is a measure of how relevant the identified entity is to the search query from which the particular entity identifier is derived from. The entity provider module 608 includes a freshness score calculator 610 and a popularity score calculator 612. The freshness score calculator 610 calculates a freshness score for each of the entities identified for a particular entity identifier, as described in more detail below with reference to FIG. 7. The freshness score for an entity is a measure of the newness of information associated with the entity. The popularity score calculator 612 calculates a popularity score for each of the entities identified for a particular entity identifier, as described in more detail below with reference to FIG. 7. The popularity score for an entity is a measure of the popularity of the entity. The entity provider module 608 determines the relevancy score from the freshness score and popularity score, as described in more detail below with reference to FIG. 7.

Associated entities 614 are identified from the identified entities based on their respective relevance scores. The entity provider system 602 provides the associated entities 614, as described in more detail below with reference to FIG. 7. The associated entities 614 are presented to the user that submitted the search query. In some implementations, additional information associated with the identified entities is also presented with the identified entities.

Figure 7:
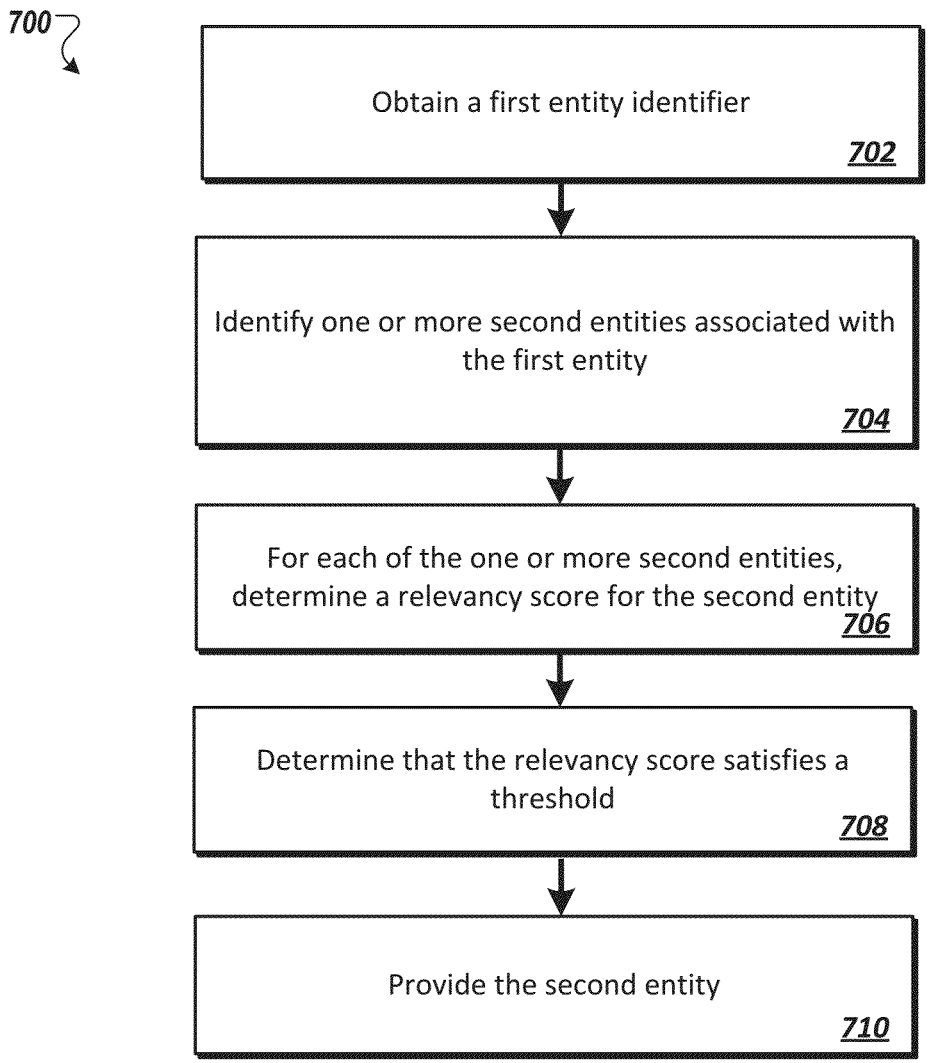
FIG. 7 illustrates an example method for providing entities in response to a query.

FIG. 7 illustrates an example method for providing entities in response to a query. For convenience, the example method 700 will be described in reference to a system that performs method 700. The system can be, for example, the entity provider system 602 described above with reference to FIG. 6. In some implementations, the system can be one or more computers.

The system obtains a first entity identifier (702). The first entity identifier identifies a first entity that is derived from a search query. In some implementations, the search query can be submitted to a general user interface provided by a search engine, e.g., a web page with a query text input field. A client device can access the general user interface over a network. The search query can be submitted to the search engine by various methods. For example, a user interface device, e.g., keyboard, mouse, touch display, associated with the client device can be used to submit the search query to the search engine. As a further example, the search query can be spoken and an audio input device associated with the client device will detect the query and transmit the search query to the search engine. The search query is then processed to derive the first entity.

In some implementations, the first entity is derived by matching the search query with entities in a data source, e.g., data organized in the form of a knowledge graph. For example, the terms of the search query can be matched with the terms that represent the candidate entities in the knowledge graph. The first entity is the candidate entity with the highest level of match with the search query. In some implementations, an algorithm is used by the system to derive the first entity. For example, the algorithm can be a probability function that determines the probability that a candidate entity in the knowledge graph matches the search query. The probability function can determine the probability for a candidate entity from the number of letters or words that represent the candidate entity that match the letters or words in the search query. For example, the greater the number of letters or words that match between the first entity and the candidate entity, the greater the probability assigned the candidate entity. The first entity is the candidate entity with the greatest assigned probability.

The system identifies one or more second entities associated with the first entity (704). The one or more second entities are identified from data sources, e.g., data organized in the form of one or more knowledge graphs or publicly available databases as described above. For example, the one or more second entities are identified from a knowledge graph portion containing the schema for the first entity in the data source. In some implementations, any entity that is associated with the first entity in the schema can be identified as a second entity. In some implementations, only the entities represented by entity nodes that are directly connected to the entity node that represents the first entity are identified as second entities. In other implementations, entities represented by entity nodes that are not directly connected to the entity node that represents the first entity can be identified as second entities. For example, entities that are represented by entity nodes that are separated from the entity node that represents the first entity by n intervening nodes can be identified as second entities, where n is a predetermined integer. For example, if n=1 and the system receives "NBA" as the first entity identifier, the system can identify "Kobe Bryant" as a second entity from the example knowledge graph portion 500 illustrated in FIG. 5.

For each of the one or more second entities, the system determines a relevancy score for the second entity (706). In some implementations, the relevancy score is determined from a measure of the popularity and a measure of the freshness of the second entity. The measure of the popularity can be a popularity score calculated for the second entity. The popularity score for the second entity can be calculated from signals that indicate the popularity of the second entity. In some implementations, the system calculates the popularity score from the number of queries that are for the second entity. A query for a second entity is a query that is associated with the second entity. For example, the terms in a query for a second entity can describe the second entity itself. As a further example, a query for a second entity is a query where a search engine returns information associated with the second entity. The number of queries for the second entity can be obtained from query logs of one or more search engines. For example, the number of queries for the second entity from multiple query logs from multiple search engines can be combined to generate the total number of queries that are for the second entity. The popularity score can be calculated from the total number of queries for the second entity. Second entities that are queried more often are assigned greater popularity scores than second entities that are queried less often. In some implementations, the system calculates the popularity score from the number of queries for the second entity within a time period. The time period can be any amount of time. The time period can be from the date that the system is determining the popularity score. For example, the system calculates the popularity score for the second entity from the number of queries for the second entity within the last two months. In some implementations, each of the queries for the second entity can be weighted based on how recent the particular query was performed. For example, if there has been the same number of queries for two different second entities in the last month, the system calculates a greater popularity score for the second entity with the more recent queries. In some implementations, the system calculates the popularity score for the second entity from the change in the number of queries for the second entity within a particular time period compared to an earlier time period. For example, the system calculates a greater popularity score for the second entity with a greater increase in the number of queries for the second entity in the last month compared to the previous month than a second entity that experienced a lesser increase.

In some implementations, the system calculates the popularity score from the number of interactions with the second entity in one or more social networks. An interaction with a second entity in a social network can be any action that a social network user performs that is associated with the second entity in the social network. Examples of these associations can include tagging the second entity in a post, commenting on posts about the second entity, re-sharing posts about the second entity, expressing approval for the second entity, posting on the second entity's social network page, etc. The number of interactions with a particular second entity can be combined from multiple social networks. Second entities that have a greater number of interactions from users in social networks are assigned greater popularity scores than second entities that have lesser user interactions. In some implementations, the system calculates the popularity score from the number of interactions with the second entity in one or more social networks within a time period. The time period can be any amount of time. The time period can be from the date that the system is determining the popularity score. For example, the system calculates the popularity score for the second entity from the number of interactions with the second entity within the last two months. In some implementations, each of the interactions with the second entity can be weighted based on how recent the particular interaction was performed. For example, if there has been the same number of interactions with two different second entities in the last month, the system calculates a greater popularity score for the second entity with the more recent interactions. In some implementations, the system calculates the popularity score for the second entity from the change in the number of interactions with the second entity within a particular time period compared to an earlier time period. For example, the system calculates a greater popularity score for the second entity with a greater increase in the number of interactions with the second entity in the last month compared to the previous month than a second entity that experienced a lesser increase.

In some implementation, the popularity score can be calculated from the number of documents that reference the second entity. The documents can be from any corpus, e.g., a collection or repository of content. The documents are processed and updated in one or more index databases. The index databases contain information describing the content of the documents. For example, the documents that can be accessed via the Internet can be processed and indexed in an index database. The index database can contain information describing the content of each document, e.g., the document terms, location of the terms, number of times the term appears, etc. The system can analyze this information to determine the number of documents that reference the second entity. A document references the second entity if it contains the terms that identify the second entity. Second entities that are referenced by documents more often are assigned greater popularity scores than second entities that are referenced less often. In some implementations, the popularity score can be calculated from a combination of the number of queries for the second entity, number of interactions with the second entity in one or more social networks, and number of documents that reference the second entity.

The measure of the freshness can be a freshness score calculated for the second entity. The freshness score for the second entity can be calculated from signals that indicate the freshness of the second entity. In some implementations, the freshness score can be calculated from one or more dates that are associated with the second entity. The more recent the date associated with the second entity, the greater the freshness score calculated for the second entity. Entities of different entity types can be associated with different milestone dates. For example, movie entities can be associated with the release dates of the respective movies. As further examples, sports matches can be associated with their corresponding match dates, sports players can be associated with the dates of the most recent news articles written about the players, etc. The system can obtain these dates from any information source. In some implementations, the system can obtain dates associated with a second entity from a knowledge graph portion containing the schema for the second entity. For example, if the second entity is the movie The Dark Knight Rises, the system can obtain the movie release date "Jul. 20, 2012" from entity node 434 in example knowledge graph portion 400 illustrated in FIG. 4 as the date associated with The Dark Knight Rises. As a further example, if the second entity is the Lakers v. Bulls match, the system can obtain the match date "Aug. 9, 2012" from entity node 554 in example knowledge graph portion 500 illustrated in FIG. 5 as the dated associated with the Lakers v. Bulls match. In some implementations, an entity can be associated with more than one date. The system can calculate the freshness score for an entity from an average of the dates associated with the entity. For example, the freshness score for an entity with the two associated dates, Aug. 1, 2012 and Aug. 11, 2012, can be calculated from the date Aug. 6, 2012. Other combinations of dates, for example, a weighted average, can also be used. As another example, the system can calculate the freshness score from a particular date selected from the multiple dates, for example, the most recent date associated with the entity, the earliest date associated with the entity, the median date associated with the entity, etc.

The system generates the relevancy score for the entity from the popularity score and the freshness score. For example, the system can use the popularity score and the freshness score as inputs to a function that outputs a relevancy score. For example, the popularity score and the freshness score can be multiplied or divided, and can be scaled or weighted.

If the system determines that the relevancy score does not satisfy a threshold, then the system takes no further action on the first entity identifier. If the system determines that the relevancy score satisfies a threshold (708), then the system provides the second entity (710). In some implementations, the second entity is provided to the user that submitted the original search query to the search engine. Search results generated by the search engine in response to the search query can be optionally provided with the second entity. The search results and second entity can be presented in an organized fashion to the user, e.g., a search results web page displayed in a web browser running on the user's client device.

In some implementations, additional information associated with the second entity can be provided with the second entity. For example, movie entities can be presented with their release dates, sports matches can be presented with their box scores or match dates, sports teams can be presented with their match schedules, etc.

In some implementations, the second entity and information associated with the second entity can be presented in a manner that is distinct from how the search results are presented. For example, the second entity and associated information can be presented in the form of an answer box. The user can quickly distinguish the contents of the answer box from the search results. The answer box includes text describing the second entity and any information associated with the second entity. In some implementations, the second entity and information associated with the second entity can be presented audibly. For example, in response to a voice search query, an output device, e.g., speakers, of the client device can generate audio describing the second entity and information. The audio can be generated at the same time that the search results are presented in a non-acoustic manner, e.g., displayed on a display screen of the client device.

In some implementations, more than one second entity can have a relevancy score that satisfies the threshold. The presented answer box can include text describing the more than one second entity that satisfies the threshold relevancy score. In some implementations, the answer box can describe a maximum of n second entities, where n is an integer. The second entities in the answer box can be organized based on the relevancy score for each second entity. For example, the second entity with the greatest relevancy score can be presented at the top of the answer box. The second entity with the lowest relevancy score can be presented at the bottom of the answer box.

Figure 8A:
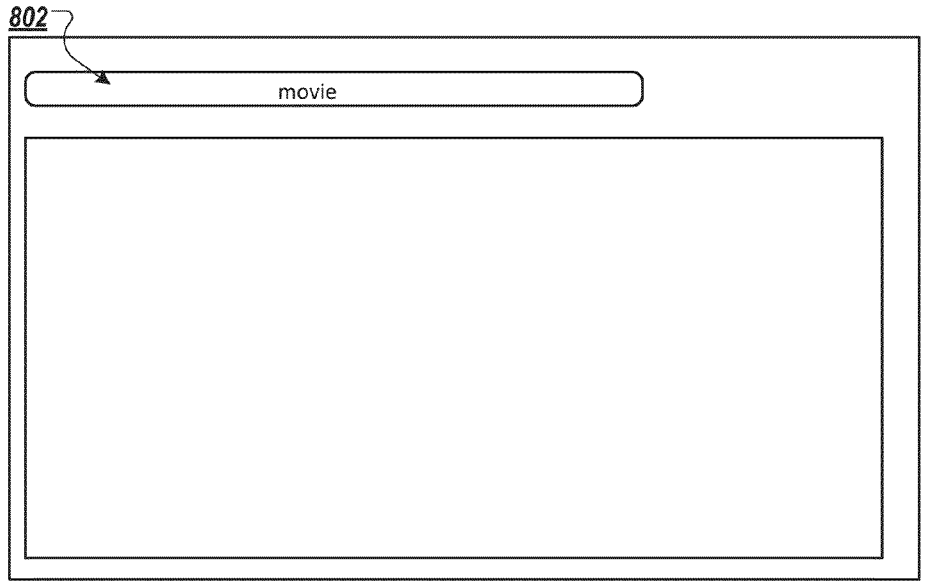
FIGS. 8A and 8B illustrate an example graphical user interface for providing entity information in response to a query.
Figure 8B:
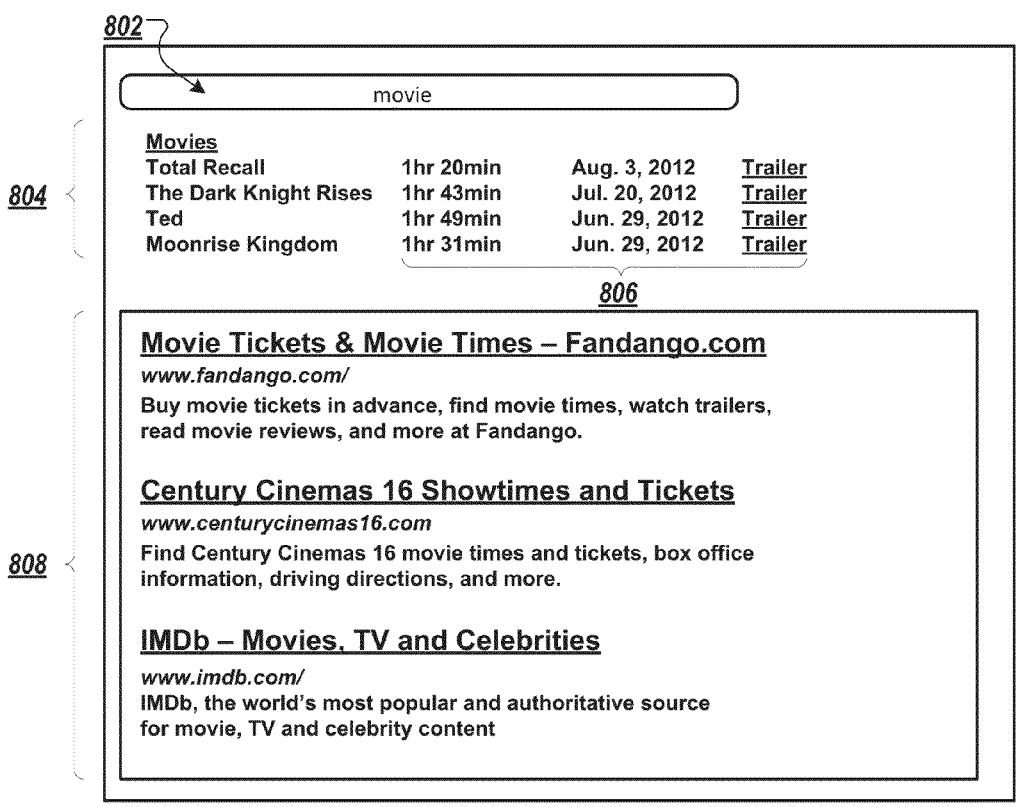

FIGS. 8A and 8B illustrate an example graphical user interface for providing entity information in response to a query.

In FIG. 8A, a user submits the search query "movie" 802 to a search engine through the graphical user interface. The search query "movie" 802 can be matched with the entity "movie." A system, for example, the entity provider system 602 described above with reference to FIG. 6, can obtain text that identifies the entity "movie." The system can access a knowledge graph portion in a data source containing a schema for "movie" in order to identify entities associated with "movie," for example, knowledge graph portion 400 illustrated in FIG. 4. From knowledge graph portion 400, the system can identify "Total Recall," "The Dark Knight Rises," "Ted," "Moonrise Kingdom," and "Brave" as entities associated with "movie." The system determines relevancy scores for each of these entities. The relevancy scores can be based on a freshness score and a popularity score for each of the entities. From the knowledge graph portion 400, the system can obtain the movie release dates for each of the movie entities. The movie release dates can be used to calculate the freshness score for each of the movie entities. Because movie entity "Total Recall" has the most recent release date of Aug. 3, 2012, "Total Recall" has the greatest freshness score. Because movie entity "Brave" has the earliest release date of Jun. 22, 2012, "Brave" has the lowest freshness score. The system can also obtain popularity information for each of the movie entities. For example, "Total Recall" may be the most queried movie, while "Brave" may be the least queried movie. Therefore, "Total Recall" also has the greatest popularity score and "Brave" also has the lowest popularity score. The relevance scores for the movie entities are calculated from the freshness and popularity scores.

In FIG. 8B, the user is presented with information in the graphical user interface in response to the search query "movie" 802. The movie entities with relevance scores that satisfy the threshold are presented in an answer box 804. Text describing "Total Recall," "The Dark Knight Rises," "Ted," and "Moonrise Kingdom" is presented in the answer box 804 in order of their corresponding relevance scores. "Brave" is not presented because its relevance score does not satisfy the threshold. Additional information 806 related to each of the presented movie entities is presented with their respective movie entities. The running times and movie release dates are shown with their respective movie entities. Links to trailers for the movie entities are also presented. Other information can be presented, for example, showing times and theatre locations. Search results 808 generated by the search engine are also presented.

Figure 9A:
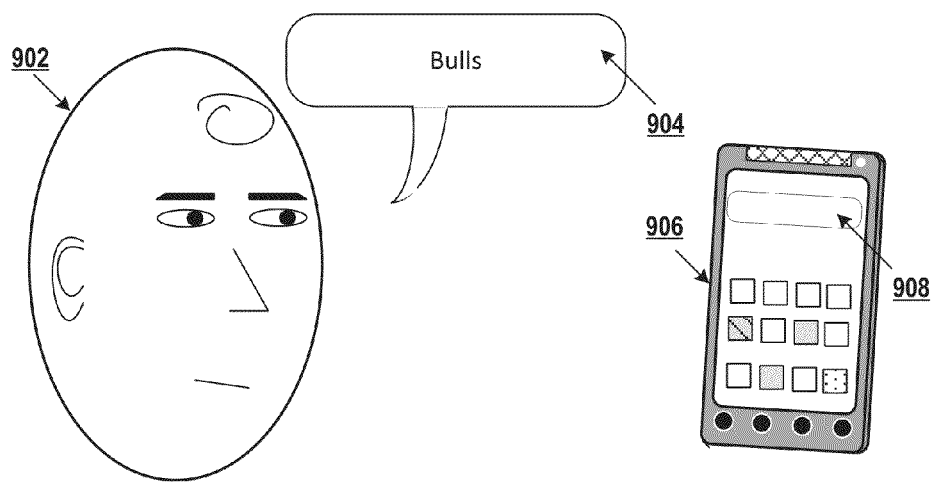
FIGS. 9A and 9B illustrate another example graphical user interface for providing entity information in response to a query.
Figure 9B:
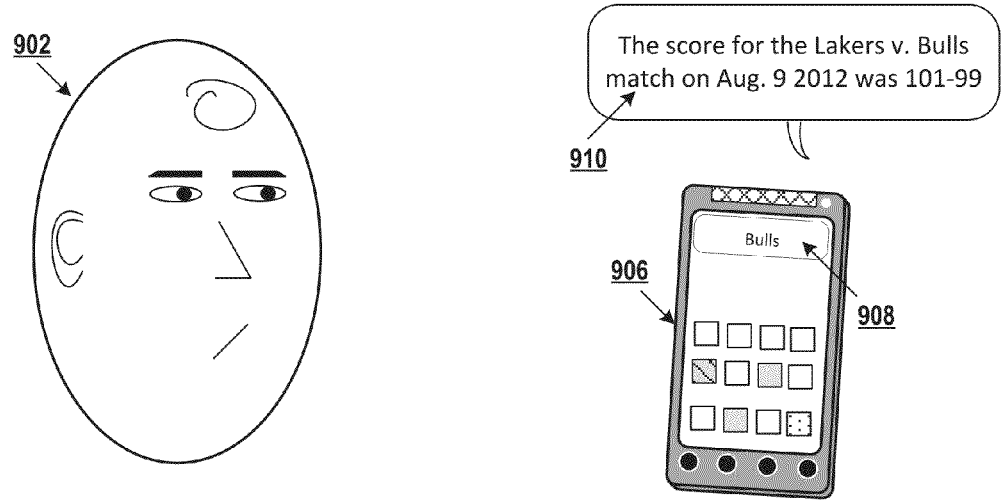

FIGS. 9A and 9B illustrate another example graphical user interface for providing entities in response to a query.

In FIG. 9A, a user 902 speaks the search query "Bulls" 904 to a client device 906. The client device 906 detects the search query and transmits the query 904 to a search engine through a graphical user interface 908 provided by the search engine. The search query "Bulls" can be matched with the Bulls entity, the NBA basketball team. A system, for example, the entity provider system 602 described above with reference to FIG. 6, can obtain text that identifies the entity "Bulls." The system can access a knowledge graph portion in a data source containing a schema for "Bulls" in order to identify entities associated with "Bulls," for example, knowledge graph portion 500 illustrated in FIG. 5. From knowledge graph portion 500, the system can identify the "Lakers v. Bulls" match, the "Bulls v. Thunder" match, and player "Derek Rose" as entities associated with "Bulls." The system determines relevancy scores for each of these entities. The relevancy scores can be based on a freshness score and a popularity score for each of the entities. From the knowledge graph portion 500, the system can obtain the match dates for each of the match entities. The match dates can be used to calculate the freshness score for each of the match entities. Because the match date of Aug. 9, 2012 for match entity "Lakers v. Bulls" is more recent than the match date of Aug. 3, 2012 for match entity "Bulls v. Thunder," "Lakers v. Bulls" has a greater freshness score. Entity "Derek Rose" may not have any date associated with the entity, and is thus assigned a low freshness score. The system can also obtain popularity information for each of the entities. For example, the Lakers v. Bulls game may be the most popular game of the year, and is therefore the most queried match in the NBA. Therefore, the "Lakers v. Bulls" entity has a higher popularity score than the "Bulls v. Thunder" entity. As one of the most popular players in the NBA, Derek Rose may receive a large number of queries and have a high popularity score. The relevance scores for the entities are calculated from the freshness and popularity scores. For example, the relevance score calculated for the "Lakers v. Bulls" entity is greater than the relevance score for the "Bulls v. Thunder" entity due to its greater freshness and popularity score.

In FIG. 9B, the user is presented with information in response to the search query "Bulls" 904. The entities with relevance scores that satisfy the threshold are presented audibly to the user. Only information for the entity "Lakers v. Bulls" is presented because the relevance scores for entity "Derek Rose" and the entity "Chicago v. Bulls" do not satisfy the threshold. The client device 906 outputs audio 910 describing the entity "Laker v. Bulls." Additional information related to the entity is also presented audibly with the entity. For example, the client device 906 also outputs audio that describes the match date, "Aug. 9, 2012," and match box score, "101-99," for the entity "Lakers v. Bulls."

An electronic document, which for brevity will simply be referred to as a document, may, but need not, correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
    receiving a query from a client device;
    determining, from data identifying a graph containing a plurality of nodes and a plurality of edges, a first node that represents a first entity determined from the query, wherein each edge connects one node in the graph to another node in the graph, wherein each node represents a respective entity, and wherein each edge identifies a relationship between entities represented by the nodes connected by the edge;
    identifying, as entities having a relationship to the first entity, one or more second entities that are each represented by a respective second node that is connected to the first node in the graph by an edge; and
    for each second entity:
        determining a measure of popularity of the second entity,
        determining a measure of freshness of the second entity, comprising:
            identifying plurality of dates identified in nodes connected by edges to the second node that represents the second entity in the graph,
            computing an average of the plurality of dates identified in the nodes connected by edges to the second node, and
            determining the measure of freshness of the second entity based on how recent the average of the plurality of dates is,
        determining, from the measure of freshness and the measure of popularity, a relevancy score that represents a relevance of the second entity to the query,
        determining whether the relevancy score satisfies a threshold, and
        in response to determining that the relevancy score satisfies the threshold, providing the second entity in response to the query for presentation on the client device.

2. The method of claim 1, wherein determining the measure of popularity of the second entity comprises:
    obtaining one or more signals that indicate the measure of the popularity of the second entity, wherein the one or more signals describe at least one of:
        a number of queries associated with the second entity;
        a number of interactions by social network users with the second entity in one or more social networks; or
        a number of documents that reference the second entity; and
    determining the measure of popularity from the one or more signals.

3. The method of claim 2, wherein the number of queries and the number of interactions are within a time period.

4. The method of claim 1, wherein providing the second entity comprises:
    providing the second entity and information associated with the second entity for presentation in an answer box displayed on the client device.

5. The method of claim 4, wherein the answer box includes the one or more second entities and respective information associated with the one or more second entities.

6. The method of claim 4, further comprising:
    obtaining search results that are responsive to the query; and
    providing the search results for presentation with the answer box displayed on the client device.

7. The method of claim 1, wherein determining, from the measure of freshness and the measure of popularity, the relevancy score that represents the relevance of the second entity to the query comprises determining the relevancy score by combining the measure of freshness and the measure of popularity.

8. A system, comprising:
    one or more computers and one or more storage devices storing instructions that are operable, when executed by the one or more computers, to cause the one or more computers to perform operations comprising:
    receiving a query from a client device;
    determining, from data identifying a graph containing a plurality of nodes and a plurality of edges, a first node that represents a first entity determined from the query, wherein each edge connects one node in the graph to another node in the graph, wherein each node represents a respective entity, and wherein each edge identifies a relationship between entities represented by the nodes connected by the edge;
    identifying, as entities having a relationship to the first entity, one or more second entities that are each represented by a respective second node that is connected to the first node in the graph by an edge; and
    for each second entity:

determining a measure of popularity of the second entity, determining a measure of freshness of the second entity, comprising:
- identifying a plurality of dates identified in nodes connected by edges to the second node that represents the second entity in the graph,
- computing an average of the plurality of dates identified in the nodes connected by edges to the second node, and
- determining the measure of freshness of the second entity based on how recent the average of the plurality of dates is, determining, from the measure of freshness and the measure of popularity, a relevancy score that represents a relevance of the second entity to the query, determining whether the relevancy score satisfies a threshold, and in response to determining that the relevancy score satisfies the threshold, providing the second entity in response to the query for presentation on the client device.

9. The system of claim 8, wherein determining the measure of popularity of the second entity comprises:
obtaining one or more signals that indicate the measure of popularity of the second entity, wherein the one or more signals describe at least one of:
- a number of queries associated with the second entity;
- a number of interactions by social network users with the second entity in one or more social networks; or
- a number of documents that reference the second entity; and determining the measure of popularity from the one or more signals.

10. The system of claim 9, wherein the number of queries and the number of interactions are within a time period.

11. The system of claim 8, wherein providing the second entity comprises:
providing the second entity and information associated with the second entity for presentation in an answer box displayed on the client device.

12. A computer storage medium encoded with a computer program, the program comprising instructions that when executed by one or more computers cause the one or more computers to perform operations comprising:
receiving a query from a client device;
determining, from data identifying a graph containing a plurality of nodes and a plurality of edges, a first node that represents a first entity determined from the query, wherein each edge connects one node in the graph to another node in the graph, wherein each node represents a respective entity, and wherein each edge identifies a relationship between entities represented by the nodes connected by the edge;

identifying, as entities having a relationship to the first entity, one or more second entities that are each represented by a respective second node that is connected to the first node in the graph by an edge; and
for each second entity:
determining a measure of popularity of the second entity, determining a measure of freshness of the second entity, comprising:
- identifying a plurality of dates identified in nodes connected by edges to the second node that represents the second entity in the graph,
- computing an average of the plurality of dates identified in the nodes connected by edges to the second node, and
- determining the measure of freshness of the second entity based on how recent the average of the plurality of dates is, determining, from the measure of freshness and the measure of popularity, a relevancy score that represents a relevance of the second entity to the query, determining whether the relevancy score satisfies a threshold, and in response to determining that the relevancy score satisfies the threshold, providing the second entity in response to the query for presentation on the client device.

13. The computer storage medium of claim 12, wherein determining the measure of popularity of the second entity comprises:
obtaining one or more signals that indicate the measure of popularity of the second entity, wherein the one or more signals describe at least one of:
- a number of queries associated with the second entity;
- a number of interactions by social network users with the second entity in one or more social networks; or
- a number of documents that reference the second entity; and determining the measure of popularity from the one or more signals.

14. The computer storage medium of claim 13, wherein the number of queries and the number of interactions are within a time period.

15. The computer storage medium of claim 12, wherein providing the second entity comprises:
providing the second entity and information associated with the second entity for presentation in an answer box displayed on the client device.

16. The computer storage medium of claim 15, wherein the answer box includes the one or more second entities and respective information associated with the one or more second entities.

* * * * *